(12) United States Patent
Park et al.

(10) Patent No.: US 9,805,600 B2
(45) Date of Patent: Oct. 31, 2017

(54) APPARATUS AND METHOD FOR PROVIDING ROAD GUIDANCE INFORMATION FOR A VEHICLE

(71) Applicant: Hyundai Motor Company, Seoul (KR)

(72) Inventors: Jong Rok Park, Seoul (KR); Dong Gyu Noh, Dongducheon-si (KR); Cho Rong Ryu, Incheon (KR); Dae Sung Hwang, Hwaseong-si (KR); Hahk Rel Noh, Bucheon-si (KR); Su Lynn Sung, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/138,586

(22) Filed: Apr. 26, 2016

(65) Prior Publication Data

US 2017/0098370 A1 Apr. 6, 2017

(30) Foreign Application Priority Data

Oct. 5, 2015 (KR) .................... 10-2015-0139872

(51) Int. Cl.
| | |
|---|---|
| *G08G 1/09* | (2006.01) |
| *G08G 1/0967* | (2006.01) |
| *G01C 21/34* | (2006.01) |
| *G08G 1/01* | (2006.01) |
| *G08G 1/04* | (2006.01) |
| *G08G 1/0962* | (2006.01) |

(52) U.S. Cl.
CPC .......... *G08G 1/0967* (2013.01); *G01C 21/34* (2013.01); *G08G 1/01* (2013.01); *G08G 1/04* (2013.01);

(Continued)

(58) Field of Classification Search
CPC .. G08G 1/0967; G08G 1/01; G08G 1/096775; G08G 1/096758;
(Continued)

(56) References Cited

U.S. PATENT DOCUMENTS

| | | |
|---|---|---|
| 6,680,674 B1 | 1/2004 | Park |
| 9,396,654 B2 | 7/2016 | Yoshioka et al. |

(Continued)

FOREIGN PATENT DOCUMENTS

| | | |
|---|---|---|
| JP | H11283163 A | 10/1999 |
| JP | 2005-049114 A | 2/2005 |

(Continued)

OTHER PUBLICATIONS

European Search Report corresponding to EP Application No. EP16167491.6 dated Feb. 16, 2017, 8 pages.

*Primary Examiner* — Dhaval Patel
(74) *Attorney, Agent, or Firm* — Brinks Gilson & Lione

(57) ABSTRACT

Disclosed herein are an apparatus and a method for providing road guidance information to a vehicle. The apparatus may include: a position measurer configured to measure a position of the vehicle; a communicator configured to receive event information from an outside of the vehicle; and a processor configured to perform guidance and a warning for an event depending on whether or not the vehicle is scheduled to pass through an event occurrence point using a travel route history recorded by the position measurer and the received event information, when absence of map data is confirmed on the basis of the event information.

18 Claims, 6 Drawing Sheets

(52) U.S. Cl.
CPC ... *G08G 1/09626* (2013.01); *G08G 1/096716* (2013.01); *G08G 1/096758* (2013.01); *G08G 1/096775* (2013.01)

(58) Field of Classification Search
CPC .............. G08G 1/096716; G08G 1/04; G08G 1/09626; G01C 21/34
USPC .......... 340/905, 435, 995.1, 989; 455/456.3; 701/123, 410, 523, 117, 408, 437, 23, 701/424, 532, 533
See application file for complete search history.

(56) References Cited

U.S. PATENT DOCUMENTS

2002/0121989 A1   9/2002   Burns
2005/0027436 A1   2/2005   Yoshikawa et al.
2015/0243166 A1   8/2015   Yoshioka et al.

FOREIGN PATENT DOCUMENTS

| | | | | |
|---|---|---|---|---|
| JP | 4682462 B | 2/2011 | | |
| JP | WO2014/013542 A1 | 1/2014 | | |
| JP | WO 2014013542 A1 * | 1/2014 | ......... | G01C 21/3691 |
| JP | 2014-89131 A | 5/2014 | | |
| JP | 2014-202707 A | 10/2014 | | |
| KR | JP 2006-268480 A | 10/2006 | | |
| KR | 10-2008-0053133 A | 6/2008 | | |
| KR | 10-2008-0076743 A | 8/2008 | | |
| KR | 10-2009-0041008 A | 4/2009 | | |
| KR | 10-2012-0013489 A | 2/2012 | | |
| KR | 10-1117168 B | 2/2012 | | |
| KR | 10-1332205 B | 11/2013 | | |
| KR | 10-2015-0090350 A | 8/2015 | | |

* cited by examiner

APPARATUS AND METHOD FOR PROVIDING ROAD GUIDANCE INFORMATION FOR A VEHICLE

CROSS-REFERENCE TO RELATED APPLICATION

This application is based on and claims the benefit of priority to Korean Patent Application No. 10-2015-0139872, filed on Oct. 5, 2015 in the Korean Intellectual Property Office, the disclosure of which is incorporated herein in its entirety by reference.

TECHNICAL FIELD

The present disclosure relates to an apparatus and a method for performing guidance for a vehicle with road guidance information and an alarm for an accident occurring on a travel route in the case in which map data may not be used.

BACKGROUND

Recently, commercialization of a vehicle to infrastructure (V2I) service linked with a traffic control surveillance center has been conducted in North America, Europe, and Japan. Particularly, in Europe, a warning and guidance service for a main event within a repairing section and an expressway has been studied as a main service.

In order to provide a high level of warning and guidance service for the event on a road described above, accurate position information on a position of road construction and additional information such as an approach route, or the like, are required. To this end, the information described above has been reflected in a vehicle to everything (V2X) message standard in Europe.

The system for providing road guidance information according to the related art described above maps map data pre-stored in a vehicle terminal and position information on an accident occurrence point provided from the traffic control surveillance center to each other to serve a warning and guidance for an accident occurring on a travel route of the vehicle.

However, the system for providing road guidance information according to the related art may not perform the warning and the guidance for the accident occurring on the travel route in the case in which the map data may not be used.

SUMMARY

The present disclosure has been made to address the above-mentioned problems occurring in the prior art while advantages achieved by the prior art are maintained intact.

An aspect of the present disclosure provides an apparatus and a method for guiding a vehicle with road guidance information and an alarm for an accident occurring on a travel route using an approach route to an accident occurrence section on a road provided from a traffic control surveillance center and a travel route history of the vehicle in the case in which map data may not be used.

In some forms of the present disclosure, an apparatus for providing guidance information for a vehicle includes: a position measurer configured to measure a position of the vehicle; a communicator configured to receive event information from outside of the vehicle; and a processor configured to perform guidance and a warning for an event depending on whether or not the vehicle is scheduled to pass through an event occurrence point using a travel route history recorded by the position measurer and the received event information, when absence of map data is confirmed on the basis of the event information.

The processor may be configured to map the driving route history and one or more approach routes included in the event information to each other to confirm whether or not a reference number of route points in a recent sequence in the travel route history and a reference number of route points from a start point of each approach route coincide with each other, thereby confirming whether or not the vehicle is traveling any one of the one or more approach routes, when the map data are not absent.

The processor may be configured to confirm whether or not one or more direction change points at which a curvature is changed by a reference or more are present on the approach route that the vehicle is traveling, when the vehicle is traveling any one approach route.

The processor may be configured to confirm whether or not the number of non-passing direction change points among the one or more direction change points is one when the one or more direction change points are present on the approach route that the vehicle is traveling.

The processor may be configured to confirm whether or not a turn signal lamp of the vehicle is in a turn-on state when the number of non-passing direction change points is one, and confirm whether or not the vehicle changes a direction to the event occurrence point when the turn signal lamp is in the turn-on state.

The processor may be configured to determine that the vehicle performs a left turn when an absolute value of a curvature difference obtained by subtracting a curvature of a previous pass point from a curvature of a current pass point of the vehicle is a reference value or more and the curvature difference is in a first range.

The processor may be configured to determine that the vehicle performs a right turn when an absolute value of a curvature difference obtained by subtracting a curvature of a previous pass point from a curvature of a current pass point of the vehicle is a reference value or more and the curvature difference is in a second range.

The processor may be configured to confirm whether or not the vehicle passes through a final direction change point when the vehicle does not change the direction to the event occurrence point, and to perform the guidance and the warning for the event depending on a confirmation result.

In additional forms of the present disclosure, a method for providing road guidance information to a vehicle includes: receiving event information from outside a vehicle; confirming whether or not map data is absent on the basis of the event information when the event information is received; confirming whether or not the vehicle is scheduled to pass through an event occurrence point using a travel route history and the received event information when the map data are not absent; and performing guidance and a warning for an event when the vehicle is scheduled to pass through the event occurrence point.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary forms of the present disclosure will be described in detail with reference to the accompanying drawings.

Figure 1:
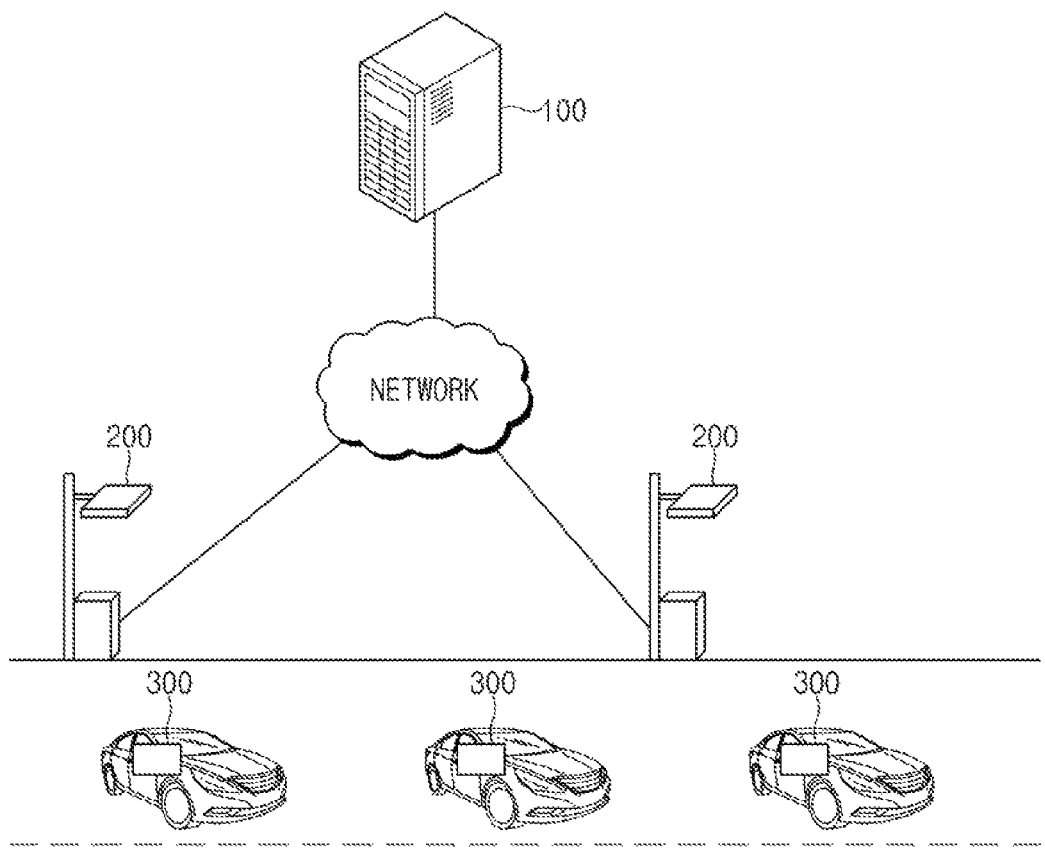
FIG. 1 is a block diagram of a system for providing road guidance information.

FIG. 1 is a block diagram of a system for providing road guidance information.

As illustrated in FIG. 1, the system for road guidance information is configured to include a traffic control server 100, infrastructures 200, and vehicle terminals 300.

The traffic control server 100 is an intelligent transport system (ITS) configured to provide traffic information and information on a road situation, or the like. The traffic control server 100 collects information on an event occurring on a road from the infrastructure 200, processes the collected information, and transmits the processed information to the infrastructure 200. In other words, the traffic control server 100 generates event information on the basis of a vehicle to everything (V2X) standard message, and provides the generated event information. Here, the event means an accident such as road construction, a traffic accident, road blocking, or the like.

In other words, the traffic control server 100 transmits the event information to the infrastructure 200. The event information includes position information on an event occurrence point, approach route information to an event occurrence section, and the like. Here, the approach route information includes one or more approach routes to the event occurrence point (section). The approach route may be a non-direct approach route through which the vehicle may approach the event occurrence section by performing a direction change once or more, or a direct approach route through which the vehicle may directly approach (enter) the event occurrence section without performing a direction change.

Although the case in which the information on the event occurring on the road is collected through the infrastructure 200 has been described by way of example, the present disclosure is not limited thereto. That is, the information on the event occurring on the road may also be collected through devices outside a traffic control surveillance center, such as the vehicle terminals, mobile terminals of users, and the like.

The infrastructure 200 is installed on the roadside, and is connected to the traffic control server 100 through the Internet network. The infrastructure 200 collects information such as a traffic situation, a road situation, and the like, within a predetermined radius, and transmits the collected information to the traffic control server 100.

The infrastructure 200 includes various sensors (a camera, an infrared sensor, a laser scanner, and the like) (not illustrated) in order to sense the event occurring on the road and collect the information on the event.

In addition, the infrastructure 200 includes a first communication module (not illustrated) performing wired communication or wireless communication with the traffic control server 100, and a second communication module (not illustrated) performing wireless communication with the vehicle terminal 300.

The infrastructure 200 receives the event information provided from the traffic control server 100 through the first communication module (not illustrated). The infrastructure 200 transmits the received event information to the vehicle terminal 300 through the second communication module (not illustrated).

The vehicle terminal 300 performs wireless communication with the infrastructure 200 and a vehicle terminal 300 mounted in another vehicle through a vehicle communication network. Here, the vehicle communication network may be implemented by a vehicle to everything (V2X) technology such as a vehicle to infrastructure (V2I) technology, a vehicle to vehicle (V2V) technology, or the like.

The vehicle terminal 300 is an apparatus for providing road guidance information regarding an event occurring on a travel road to a driver. The vehicle terminal 300 confirms whether or not an event occurs on a travel route of the vehicle on the basis of the event information received from the infrastructure 200. In addition, when the vehicle terminal 300 confirms that the event occurs on the travel route, the vehicle terminal 300 provides guidance and a warning for the corresponding event to the driver.

The vehicle terminal 300 may be implemented by a terminal such as a telematics, a navigation terminal, an AVN (audio video navigation), or the like.

Figure 2:
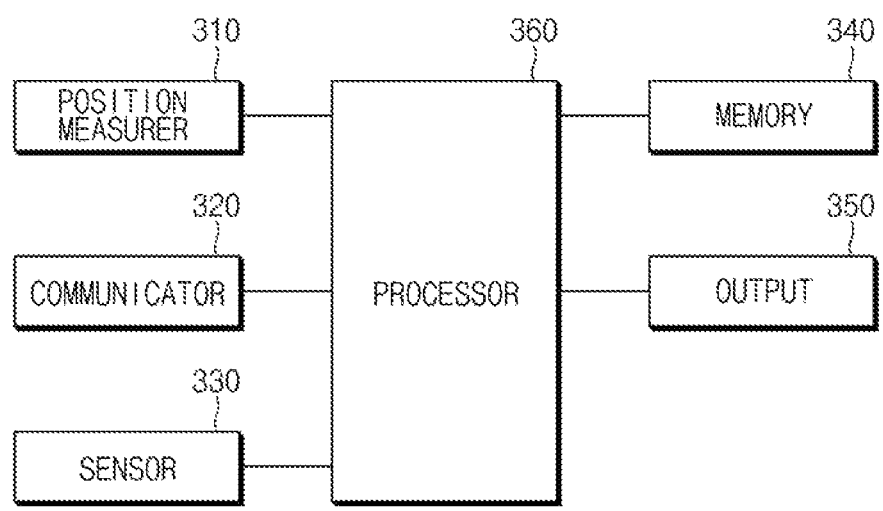
FIG. 2 is a block diagram of a vehicle terminal.

FIG. 2 is a block diagram of a vehicle terminal.

As illustrated in FIG. 2, the vehicle terminal 200 may be configured to include a position measurer 310, a communicator 320, a sensor 330, a memory 340, an output 350, and a processor 360.

The position measurer 310 measures a current position of the vehicle using a satellite signal received from a global positioning system (GPS) satellite. The position measurer 310, which is a GPS receiving module, receives a GPS value from a satellite.

The communicator 320 is a communication module performing V2X communication. The communicator 320 receives the event information provided from the traffic control server 100 through wireless communication with the infrastructure 200. In addition, the communicator 320 transmits the received event information to a vehicle terminal mounted in another vehicle.

The sensor 330 is mounted in the vehicle and senses vehicle data. For example, the sensor 330 senses a turn-on/off state of a turn signal lamp.

The memory 340 stores the map data, various programs for controlling an operation of the vehicle terminal 300, and the like, therein. In addition, data generated by the operation of the vehicle terminal 300 are stored in the memory 340.

The output 350 outputs event guidance information in one or more of forms of visual information, auditory information, and tactile information that may be recognized by the driver (user). The event guidance information includes a remaining distance from the current position of the vehicle to the event occurrence point, a roundabout route, an event content, and the like.

The output 350 may include one or more of a display means, a sound output means, and a vibration means. The display means may include one or more of a cluster, a head up display (HUD), a liquid crystal display (LCD), a three-dimensional (3D) display, and a light emitting diode (LED) display.

The sound output means may include a receiver, a speaker, a buzzer, and the like, and the vibration means may be implemented by a haptic module.

The processor 360 measures a travel route through the position measurer 310, and records and manages the measured travel route as a travel route history. The travel route history is stored in the memory 330.

The processor 360 receives the event information transmitted from the infrastructure 200 through the communicator 320. When the processor 360 receives the event information, the processor 360 confirms whether or not the map data are present on the basis of the received event information. In other words, the processor 360 confirms whether or not the map data may be used.

The processor 360 maps the map data and an approach route to the event occurrence point included in the event information to each other to confirm whether or not the vehicle is traveling the approach route, in the case in which the map data may be used. Here, the processor 360 confirms whether or not the vehicle is traveling any one of one or more approach routes included in the event information.

The processor 360 confirms whether or not one or more direction change points are present on the approach route, and confirms whether or not the vehicle passes through a final direction change point in the case in which one or more direction change points are present on the approach route. Here, the processor 360 confirms whether or not the vehicle is scheduled to pass through the event occurrence point at the time of passing through the final direction change point. The processor 360 performs a warning and guidance for the event when the vehicle is scheduled to pass through the event occurrence point.

Figure 3:
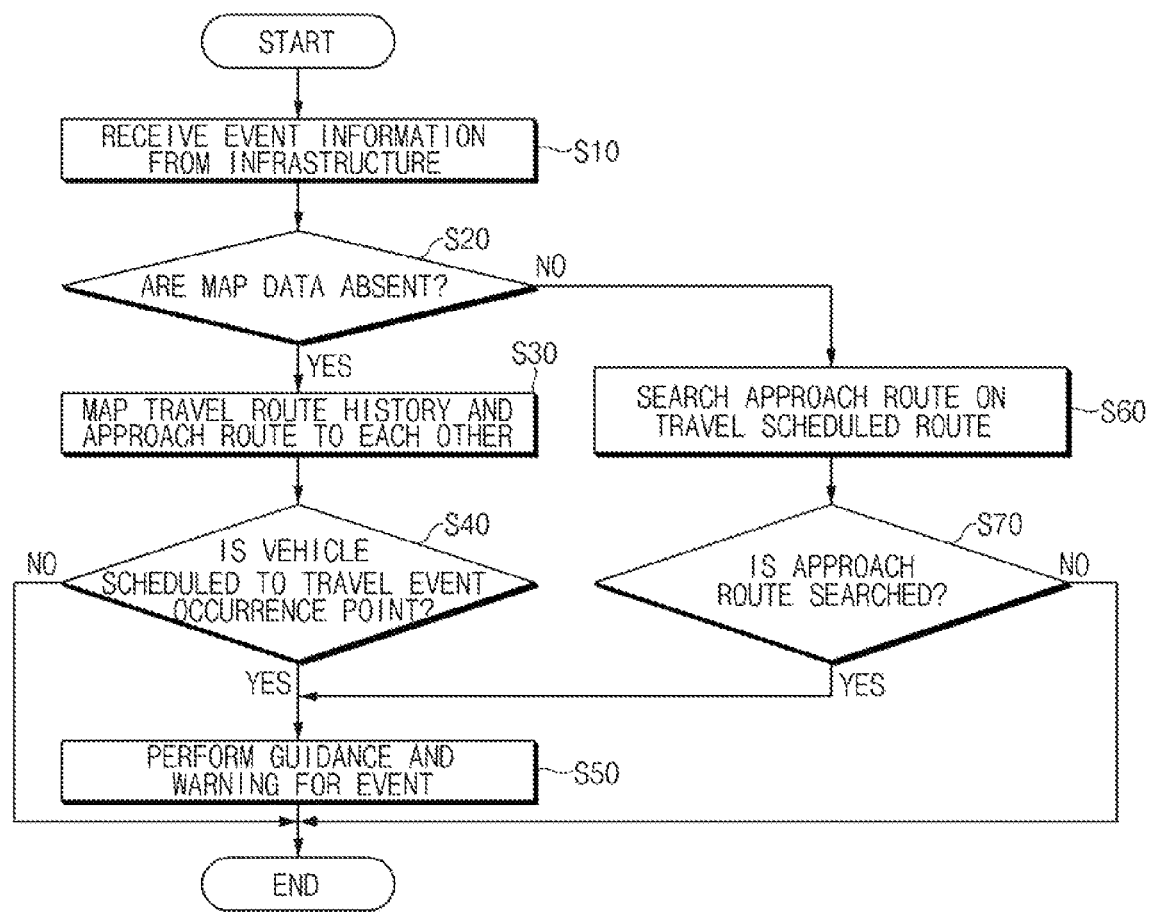
FIG. 3 is a flow chart illustrating a method for providing road guidance information to a vehicle.

FIG. 3 is a flow chart illustrating a method for providing road guidance information to a vehicle.

As illustrated in FIG. 3, the vehicle terminal 300 receives the event information from the infrastructure 200 through the vehicle communication network (S10). Here, the event information, which is information on an accident such as road blocking, road repairing, a traffic accident, or the like, includes position information on an event (accident) occurrence point, approach route information to the event occurrence point (section), and the like. Here, the approach route information includes one or more approach routes to the event occurrence point (section).

The vehicle terminal 300 confirms whether or not the map data are present on the basis of the event information (S20), when it receives the event information. In other words, the vehicle terminal 300 confirms whether or not the map data are present on the basis of the position information on the event occurrence point included in the event information.

The vehicle terminal 300 maps the travel route history of the vehicle and the approach route information in the event information to each other (S30), in the case in which the map data may not be used due to absence of the map data.

The vehicle terminal 300 confirms whether or not the vehicle is scheduled to travel the event occurrence point through the mapping (S40). In other words, the vehicle terminal 300 confirms whether or not the vehicle approaches the event occurrence point.

The vehicle terminal 300 performs the warning and the guidance for the corresponding event (S50), when the vehicle is scheduled to travel the event occurrence point.

Meanwhile, the vehicle terminal 300 searches whether or not the approach route to the event occurrence point is present on a travel scheduled route on the basis of the received event information (S60), when the map data are present in the memory 340.

The vehicle terminal 300 confirms whether or not the approach route is searched (S70). Here, in the case in which the approach route is searched, the vehicle terminal 300 performs the guidance and the warning for the event on the travel scheduled route (S50).

Figure 4:
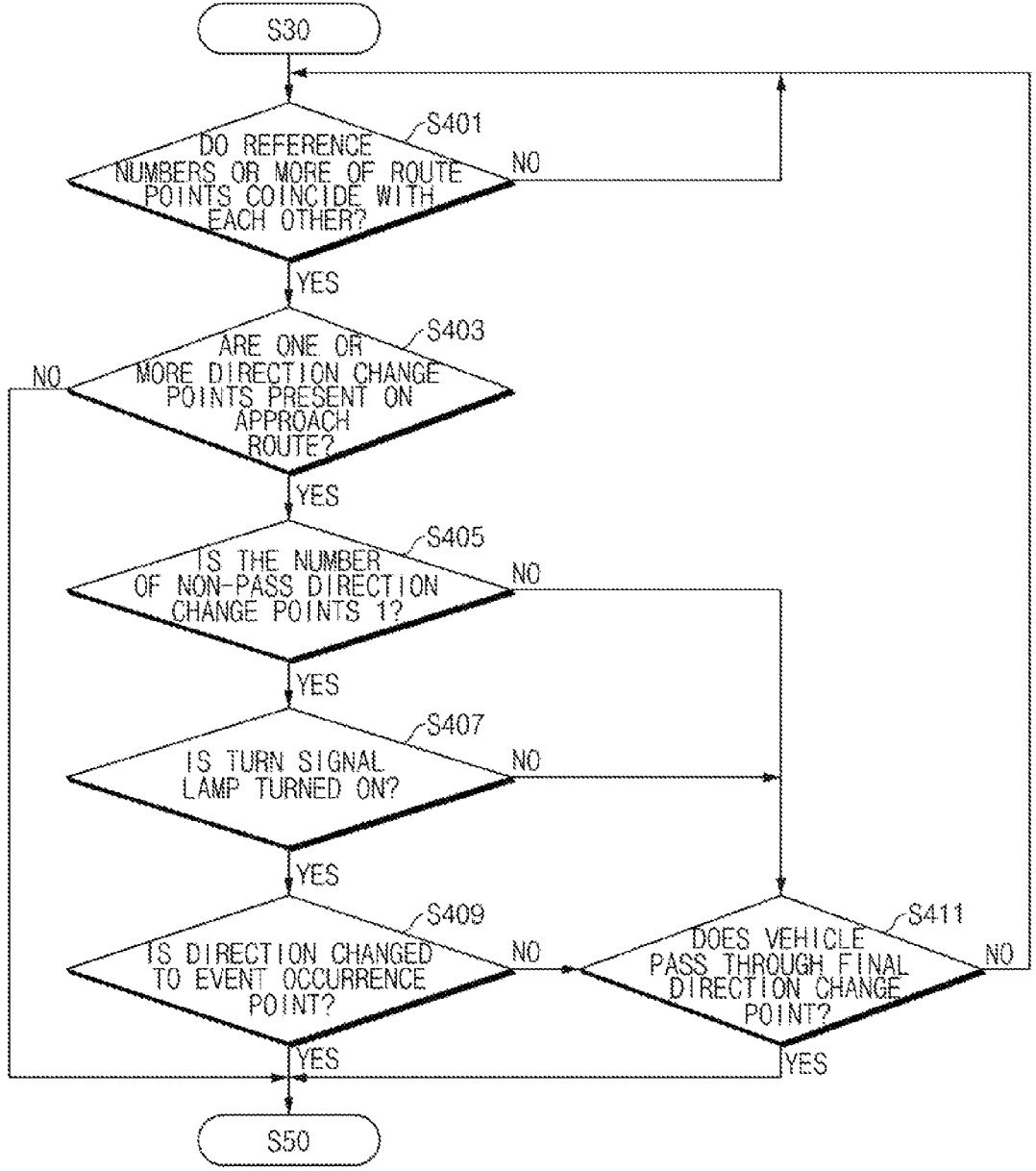
FIG. 4 is a flow chart for describing a process of confirming whether or not a vehicle is scheduled to travel near an event occurrence point illustrated in FIG. 3.
Figure 5A:
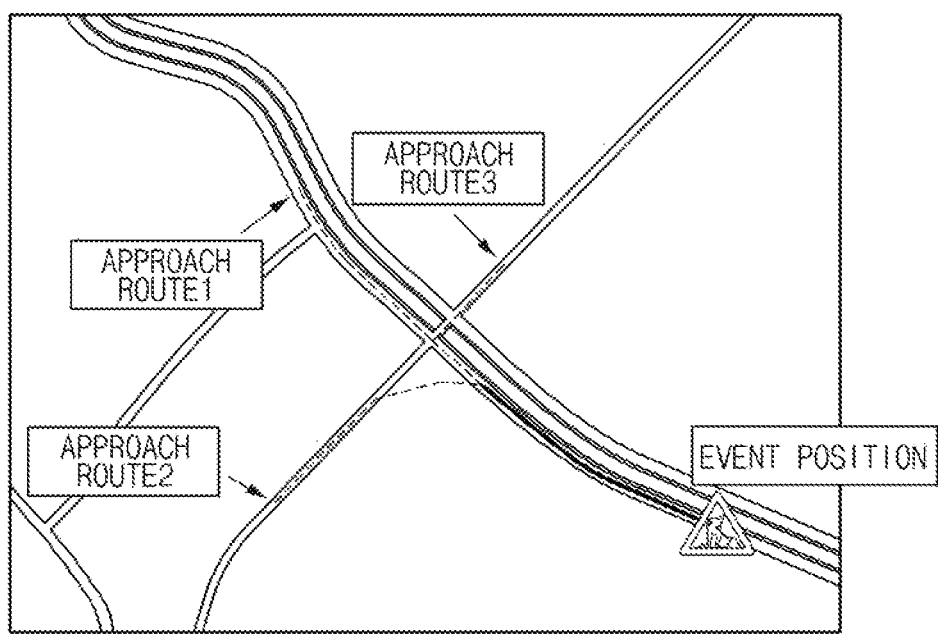
FIGS. 5A and 5B are illustrative views for describing the process of confirming whether or not a vehicle is scheduled to travel near an event occurrence point.
Figure 5B:
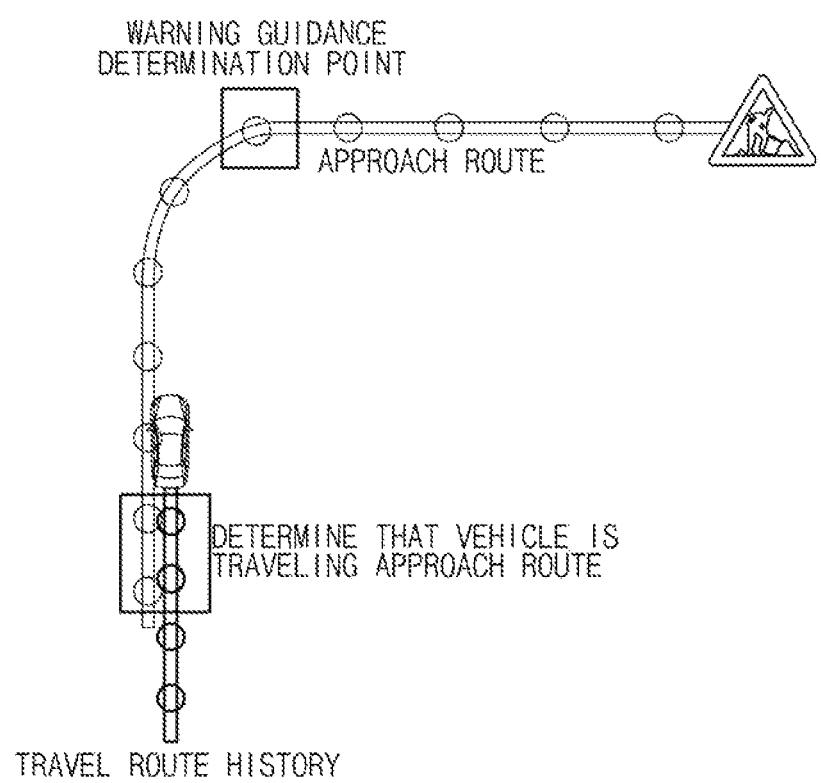

FIG. 4 is a flow chart for describing a process of confirming whether or not a vehicle is scheduled to travel an event occurrence point illustrated in FIG. 3, and FIGS. 5A and 5B are illustrative views for describing the process of confirming whether or not a vehicle is scheduled to travel an event occurrence point.

First, the vehicle terminal 300 confirms whether or not a predetermined number of route points in a recent sequence in the travel route history stored in the memory 330 and a predetermined number of route points from a start point of the approach route coincide with each other (S401). Here, the predetermined number is a predefined reference number, and the route points are GPS values measured through the position measurer 310. The vehicle terminal 300 determines the vehicle is traveling the approach route, when the reference number or more of route points coincide with each other.

For example, in the case in which the number of approach routes through which the vehicle may approach the event occurrence point is three, as illustrated in FIG. 5A, the vehicle terminal 300 may map the respective approach routes and the travel route history of the vehicle to each other to confirm whether or not the vehicle is traveling any one of the three approach routes, as illustrated in FIG. 5B.

Then, the vehicle terminal 300 confirms whether or not one or more direction change points are present on the approach route that the vehicle is traveling (S403). The vehicle terminal 300 determines that a point at which a curvature is changed by a reference (M) or more on the approach route that the vehicle is traveling is the direction change point. The curvature indicates a change in a gradient of a tangential line generated when one point moves along an arc of a curved line at a predetermined speed. A radius of a circle closest to a curved line from one point of the curved line, that is, a circle of curvature is called a radius of curvature at this point, and an inverse number of the radius of curvature is called a curvature.

The vehicle terminal 300 confirms whether or not the number of non-passing direction change points among the direction change points is one (S405), when one or more direction change points are present on the approach route that the vehicle is traveling.

The vehicle terminal 300 confirms whether or not the turn signal lamp is in a turn-on state through the sensor 330 (S407), when the number of non-passing direction change points is one.

The vehicle terminal 300 confirms whether or not the vehicle changes a direction to the event occurrence section (point) (S409), when the turn signal lamp is in the turn-on state. The vehicle terminal 300 performs the guidance and the warning for the corresponding event (S50), in the case in which the vehicle changes the direction to the event occurrence section.

In S409, the vehicle terminal 300 determines that the vehicle performs a left turn, when an absolute value of a curvature difference obtained by subtracting a curvature of the previous pass point from a curvature of the current pass point is a reference value (M) or more and the curvature difference is in a first range. Meanwhile, the vehicle terminal 300 determines that the vehicle performs a right turn, when the absolute value of the curvature difference obtained by subtracting the curvature of the previous pass point from the curvature of the current pass point is the reference value (M) or more and the curvature difference is in a second range.

Here, the first range is a range smaller than 0, and the second range is a range larger than 0. For example, in the case in which the vehicle performs the left turn, the circle of curvature is present at the left of a road curved line, such that the curvature difference is in a negative number range. In addition, in the case in which the vehicle performs the right turn, the circle of curvature is present at the right of a road curved line, such that the curvature difference is in a positive number range.

Meanwhile, when one or more direction change points are not present on the approach route that the vehicle is traveling in S403, the guidance and the warning for the event are performed.

Meanwhile, in the case in which the number of non-passing direction change points is not one in S405, the turn signal lamp is in a turn-off state in S407, or the vehicle does not change the direction to the event occurrence point (section) in S409, the vehicle terminal 300 confirms whether or not the vehicle passes through the final direction change point (S411). In other words, the vehicle terminal 300 confirms whether or not the vehicle is approaching the event occurrence point.

Then, the vehicle terminal 300 performs the guidance and the warning for the event when vehicle passes through the final direction change point. Here, the final direction change point, which is a warning guidance determination point, is a point at which the curvature is changed by the reference value (M) or more from the event occurrence position.

The vehicle terminal 300 according to an exemplary embodiment of the present disclosure may perform the guidance and the warning for the event, when the vehicle enters a start point of a section that may directly approach the event occurrence point on the approach route that the vehicle is traveling. As described above, in an exemplary form of the present disclosure, the guidance and the warning are provided to the driver at a point in time at which it is certain that the vehicle passes through the event occurrence section, thereby making it possible to improve an erroneous warning for a V2X service.

According to exemplary forms of the present disclosure, in the case in which the map data may not be used, the warning and the guidance for the accident occurring on the travel route may be performed using the approach route to the accident occurrence section provided from the traffic control surveillance center and the travel route history of the vehicle.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for providing road guidance information to a vehicle, comprising:
   a position measurer configured to measure a position of the vehicle;
   a communicator configured to receive event information corresponding to an event from outside of the vehicle; and
   a processor configured to:
   perform route guidance of the vehicle, the route guidance including a travel route history of the vehicle;
   receive the event information, the event information including an event occurrence point and one or more approach routes to the event occurrence point;
   when map data corresponding to the event occurrence point is not available as part of the performed route guidance:
   map the travel route history to the one or more approach routes;
   determine the vehicle is scheduled to pass through the event occurrence point when the mapping of the travel route history to the one or more approach routes confirms that a reference number of route points in a recent sequence of the travel route history coincides with a reference number of route points from a start point of one or more approach routes; and
   control presentation of a warning for the event based on the determination the vehicle is scheduled to pass through the event occurrence point.

2. The apparatus for providing road guidance information to a vehicle according to claim 1, wherein the processor is configured to confirm whether or not one or more direction change points at which a curvature is changed by a reference or more are present on the approach route that the vehicle is traveling, when the vehicle is traveling any one approach route.

3. The apparatus for providing road guidance information to a vehicle according to claim 2, wherein the processor is configured to confirm whether or not the number of non-passing direction change points among the one or more direction change points is one when the one or more direction change points are present on the approach route that the vehicle is traveling.

4. The apparatus for providing road guidance information to a vehicle according to claim 3, wherein the processor is configured to confirm whether or not a turn signal lamp of the vehicle is in a turn-on state when the number of non-passing direction change points is one, and to confirm whether or not the vehicle changes a direction to the event occurrence point when the turn signal lamp is in the turn-on state.

5. The apparatus for providing road guidance information to a vehicle according to claim 4, wherein the processor is configured to determine that the vehicle performs a left turn when an absolute value of a curvature difference obtained by subtracting a curvature of a previous pass point from a curvature of a current pass point of the vehicle is a reference value or more and the curvature difference is in a first range.

6. The apparatus for providing road guidance information to a vehicle according to claim 4, wherein the processor is configured to determine that the vehicle performs a right turn when an absolute value of a curvature difference obtained by subtracting a curvature of a previous pass point from a curvature of a current pass point of the vehicle is a reference value or more and the curvature difference is in a second range.

7. The apparatus for providing road guidance information to a vehicle according to claim 4, wherein the processor is configured to confirm whether or not the vehicle passes through a final direction change point when the vehicle does not change the direction to the event occurrence point, and to perform the guidance and the warning for the event depending on a confirmation result.

8. The apparatus for providing road guidance information to a vehicle according to claim 1, wherein the event information includes position information on the event occurrence point and one or more approach routes through which the vehicle is approachable to the event occurrence point.

9. A method for providing road guidance information to a vehicle, comprising:

receiving event information corresponding to an event, the event information including an event occurrence point and one or more approach routes to the event occurrence point;

confirming whether or not map data corresponding to the event occurrence point is available as part of a route guidance performed by the vehicle;

when map data corresponding to the event occurrence point is confirmed not to be available as part of the performed route guidance:

mapping the travel route history to the one or more approach routes;

determining the vehicle is scheduled to pass through the event occurrence point when the mapping of the travel route history to the one or more approach routes confirms that a reference number of route points in a recent sequence of the travel route history coincides with a reference number of route points from a start point of one or more approach routes; and controlling presentation of a warning for the event based on the determination the vehicle is scheduled to pass through the event occurrence point.

10. The method for providing road guidance information to a vehicle according to claim 9, wherein the confirming of whether or not the vehicle is scheduled to travel the event occurrence point includes:

confirming whether or not the vehicle is traveling any one of the one or more approach routes by mapping the driving route history and the one or more approach routes to each other;

confirming whether or not one or more direction change points are present on the approach route that the vehicle is traveling;

confirming whether or not the number of non-passing direction change points among the one or more direction change points is one when the one or more direction change points are present on the approach route that the vehicle is traveling;

confirming whether or not a turn signal lamp of the vehicle is in a turn-on state when the number of non-passing direction change points is one; and confirming whether or not the vehicle changes a direction to the event occurrence point when the turn signal lamp is in the turn-on state.

11. The method for providing road guidance information to a vehicle according to claim 10, wherein in the confirming of whether or not the vehicle is traveling to any one of the one or more approach routes, it is confirmed whether or not a reference number of route points in a recent sequence in the travel route history and a reference number of route points from a start point of each approach route coincide with each other by mapping the traveling route history and the one or more approach route to each other.

12. The method for providing road guidance information to a vehicle according to claim 10, wherein in the confirming of whether or not the one or more direction change points are present on the approach route, it is determined that a point at which a curvature is changed by a reference or more on the approach route that the vehicle is traveling is the direction change point.

13. The method for providing road guidance information to a vehicle according to claim 10, wherein in the confirming of whether or not the vehicle changes the direction to the event occurrence point, it is determined that the vehicle performs a left turn or right turn based on a curvature difference when an absolute value of the curvature difference obtained by subtracting a curvature of a previous pass point from a curvature of a current pass point is a reference value or more.

14. The method for providing road guidance information to a vehicle according to claim 10, wherein in the confirming of whether or not the vehicle changes the direction to the event occurrence point, the guidance and the warning for the event are performed in the case in which the vehicle changes the direction to the event occurrence point.

15. The method for providing road guidance information to a vehicle according to claim 10, wherein in the confirming of whether or not the vehicle changes the direction to the event occurrence point, it is confirmed whether or not the vehicle passes through a final direction change point in the case in which the vehicle does not change the direction to the event occurrence point, and the guidance and the warning for the event are performed depending on a confirmation result.

16. The method for providing road guidance information to a vehicle according to claim 10, wherein it is confirmed whether or not the vehicles passes through a final direction change point when the number of non-passing direction change points is not one, and the guidance and the warning for the event are performed when the vehicle passes through the final direction change point.

17. The method for providing road guidance information to a vehicle according to claim 10, wherein in the confirming of whether or not the turn signal lamp is in the turn-on state, it is confirmed whether or not the vehicle passes through a final direction change point, and the guidance and the warning for the event are performed when the vehicle passes through the final direction change point.

18. The method for providing road guidance information to a vehicle according to claim 10, wherein the guidance and the warning for the event are performed when the one or more direction change points are not present on the approach route that the vehicle is traveling.

* * * * *